United States Patent [19]

Baer

[11] 3,921,161

[45] Nov. 18, 1975

[54] PREPROGRAMMED TELEVISION GAMING SYSTEM

[75] Inventor: Ralph H. Baer, Manchester, N.H.

[73] Assignee: Sanders Associates, Inc., Nashua, N.H.

[22] Filed: Feb. 22, 1974

[21] Appl. No.: 445,022

Related U.S. Application Data

[63] Continuation-in-part of Ser. No. 365,000, May 29, 1973, abandoned.

[52] U.S. Cl. .......... 340/324 AD; 178/6.8; 273/85 R; 273/DIG. 28; 340/147 P; 360/29; 360/79

[51] Int. Cl.$^2$ .......... G06F 3/14

[58] Field of Search .......... 340/324 AD, 147 P; 178/6.6 A, 6.8; 360/29, 79; 273/DIG. 28, 85 R

[56] References Cited

UNITED STATES PATENTS

| | | | |
|---|---|---|---|
| 2,847,661 | 8/1958 | Althouse | 340/212 |
| 3,002,801 | 10/1961 | Bomzer et al. | 360/79 |
| 3,009,025 | 11/1961 | Takayanagi et al. | 360/29 |
| 3,017,625 | 1/1962 | Evans et al. | 340/324 AD |
| 3,051,777 | 8/1962 | Lemelson | 178/6.6 A |
| 3,317,783 | 5/1967 | Neumeister | 340/324 A |
| 3,562,415 | 2/1971 | Michels et al. | 178/6.8 |

*Primary Examiner*—David L. Trafton
*Attorney, Agent, or Firm*—Louis Etlinger; Richard I. Seligman

[57] ABSTRACT

Apparatus for playing games on the cathode ray tube screen of a television receiver is disclosed comprising a gaming device having components for providing location controllable spots on the screen, a source of prerecorded modulated audio frequency control signals, and means for demodulating those control signals and for supplying them to selected gaming device components to thereby provide gaming capabilities where the progress of a game is in part controlled by the recorded signals and in part controlled by the actions of a player. The signal source may be a magnetic tape or record/disc player and a selected prerecorded game tape or disc with control signals recorded thereon as a plurality of modulated audio frequency signals to thereby allow signal separation based on frequency and waveform control techniques and subsequent demodulation of each so separated carrier to provide a plurality of control signals.

25 Claims, 10 Drawing Figures

PREPROGRAMMED TELEVISION GAMING SYSTEM

This is a continuation-in-part of application Ser. No. 365,000, filed May 29, 1973, now abandoned.

BACKGROUND OF THE INVENTION

The present invention relates generally to electronic game devices and more particularly to electronic game devices which generate signals for displaying spots on a television receiver screen. More specifically the present invention relates to such a televison gaming device where certain of the visible variables associated with one or more of the spots is under the control of a player while certain of the visible variables are automatically controlled by a selection preprogrammed game tape.

Electronic game devices which generate signals for spots to be displayed on a television receiver screen are known in the prior art and well illustrated by U.S. Pat. Nos. 3,659,284, 3,659,285 3,728,480 and 3,778,058 as well as copending application Ser. No. 293,202 filed Sept. 28, 1972 and now Pat. No. 3,809,395, entitled: Television Combat Game, and copending application Ser. No. 295,389 filed Oct. 15, 1972 and now abandoned, entitled: Game Circuit Selector, both in the names of Allison & Greaf, the entire disclosures of all of which are specifically incorporated herein by reference. The electronic game device represented by these patents and copending applications is a multiple game attachment for a television receiver having electrical circuitry or components for generating signals which when supplied to the receiver will cause the receiver to display movable game playing indicia or spots.

The device of certain ones of the aforementioned patents and applications may be used to play several different games wherein certain of the spots rebound from others when coincident therewith. Typical games employing this feature would be ping-pong, baseball, tennis, handball, basketball, billiards and the like. In this first category of "rebound" games, a ball spot and two player spots are generated on the screen with the two player spots being individually controllable in both components of their location on the screen. Typically each participant is provided with a pair of potentiometers for controlling the horizontal and vertical location of his spot. The ball spot executes a horizontal sweep across the screen of the receiver unless it is intercepted by a player spot in which case the ball reverses its direction of sweep. The ball motion is typically controlled by the charging and discharging of a capacitor with the ball speed being controllable by setting a potentiometer which is in circuit with the capacitor. If the ball is not intercepted by one of the players it will move to an off screen position until reset (served) by one of the players. In addition to a reset button and horizontal and vertical position controls, each player control unit may also include a so-called "English" control which allows the player to control the vertical position of the ball during its pass across the screen if the ball is going away from that player's spot location. This is acomplished by a so-called English flip-flop which in one state allows a first player to control the English of the ball when it is moving from left to right and in the other state allows the other player to control the ball English when it is moving from right to left.

The electronic game device represented by certain ones of the aforementioned patents and applications is also capable of a second category of games wherein two player spots are generated and controllable as in the first category of rebound games, however, the ball spot is extinguished when it becomes coincident with one of the player spots. A variation on the disappearing ball type game may be achieved by providing circuitry for causing the ball when coincident with one player spot to move away from that spot in the direction in which the spot had been moving just prior to contact and with a velocity proportional to the velocity of that spot at the time of contact. With this arrangement of a golf game may be simulated by using one of the player spots to represent a golf club and the other to represent a golf hole. The single participant in this game strikes the ball with his "putter" spot and moves toward the hole spot in accordance with the manner in which it was struck and when the ball becomes coincident with the hole spot it disappears. Another variation on the disappearing ball feature may be employed in a shooting gallery type situation where the ball executes recurrent horizontal sweeps across the screen and a light sensing gun is employed to "shoot" the ball. If the light sensing gun is enabled at the appropriate time, the ball will be extinguished. As another variation on the target shooting idea, two light sensing guns may be employed and the ball made to reverse its direction of motion on each head leading to a gun ping-pong type of game as disclosed in the aforementioned patents.

The aforementioned patents and applications also teach games employing obstacle spots representing, for example, bowling pins and impelling the ball symbol toward an obstacle and if two symbols become coincident the obstacle, ball, or both may be extinguished. A variation on an obstacle type game is a chase-type game wherein one player controls the chasing spot and the other player controls the chased spot and one or both of the spots is extinguished in the event that they become coincident. A further variation of this chase-type game is for the chasing player to employ the ball as a projectile which he may fire by depressing a reset button and then control only the vertical position of the ball by changing his English control while the horizontal position of the ball is determined by the charging of discharging of the aforementioned capacitor.

From the foregoing summary of the capabilities of know apparatus for playing games on the screen of a cathode ray tube, it should be clear that there is in such equipment a quite limited repertoire of situations where one or more components of a spot location are other than fixed or player controllable. It should further be clear that most of the games require the active participation of two players and the equipment capability for one player games is limited.

It is accordingly one object of the present invention to provide a one player competitive television gaming device.

Another object of the present invention is to extend the scope of existing television game playing devices.

A further object of the present invention is to provide a preprogrammed behavior for a game display.

A still further object of the present invention is to add greater versatility to television gaming circuits.

Yet another object of the present invention is to provide a versatile auxiliary input device for television gaming circuitry.

Still another object is to provide a recorded opponent for a competitive game playing device.

A yet further object of the present invention is to expand the scope of games playable on a television receiver screen.

A salient object of the present invention is to achieve one or more of the foregoing objects at a nominal additional expense in mose instances.

An additional object of the present invention is to allow the use of typical commercial low-cost open-reel, cassette or cartridge players or records/discs having the commonly experienced defects of indeterminate speed variations, wow, flutter, harmonic and intermodulation distortion, and yet perform the desired functions.

SUMMARY OF THE INVENTION

The foregoing as well as numerous other objects and advantages of the present invention are achieved by providing apparatus for playing games on the screen of a cathode ray tube including means for generating and displaying on the screen game spots having a plurality of visible variables such as horizontal and vertical position, size, intensity, and color associated therewith; player actuable means coupled to the generator for controlling certain ones of the variables; and preprogrammed means such as a magnetic tape and tape reader coupled to the generator for automatically controlling certain ones of the variables in accordance with information recorded thereon to thereby allow active participation by a player in determining the progress of the game while a part of the progress of the game is predetermined by the information recorded on a selected game tape. A "library" of such tapes for numerous games may be provided. The game progress determining information may be recorded on the game tape as frequency, amplitude or pulse width modulated audio frequency signals and the game tape may be played on a standard tape recorder requiring only the addition of some type of demodulator and the appropriate means for coupling the control signals to the prior art gaming device. Audio information or additional control signals may be recorded in a second track on the tape if desired and a plurality of control signals may be recorded on a single track by frequency multiplexing or other multiplexing scheme.

It is accordingly a specific object of the present invention to provide prerecorded and home recorded game spot control for one or more of the spots in a television gaming device requiring a minimal amount of equipment in addition to equipments already available.

BRIEF DESCRIPTION OF THE DRAWING

The aforementioned and other objects, features and advantages of the present invention will become more apparent from the following detailed description thereof when considered in conjunction with the drawings wherein.

DESCRIPTION OF THE PREFERRED EMBODIMENT

Figures 1, 2:
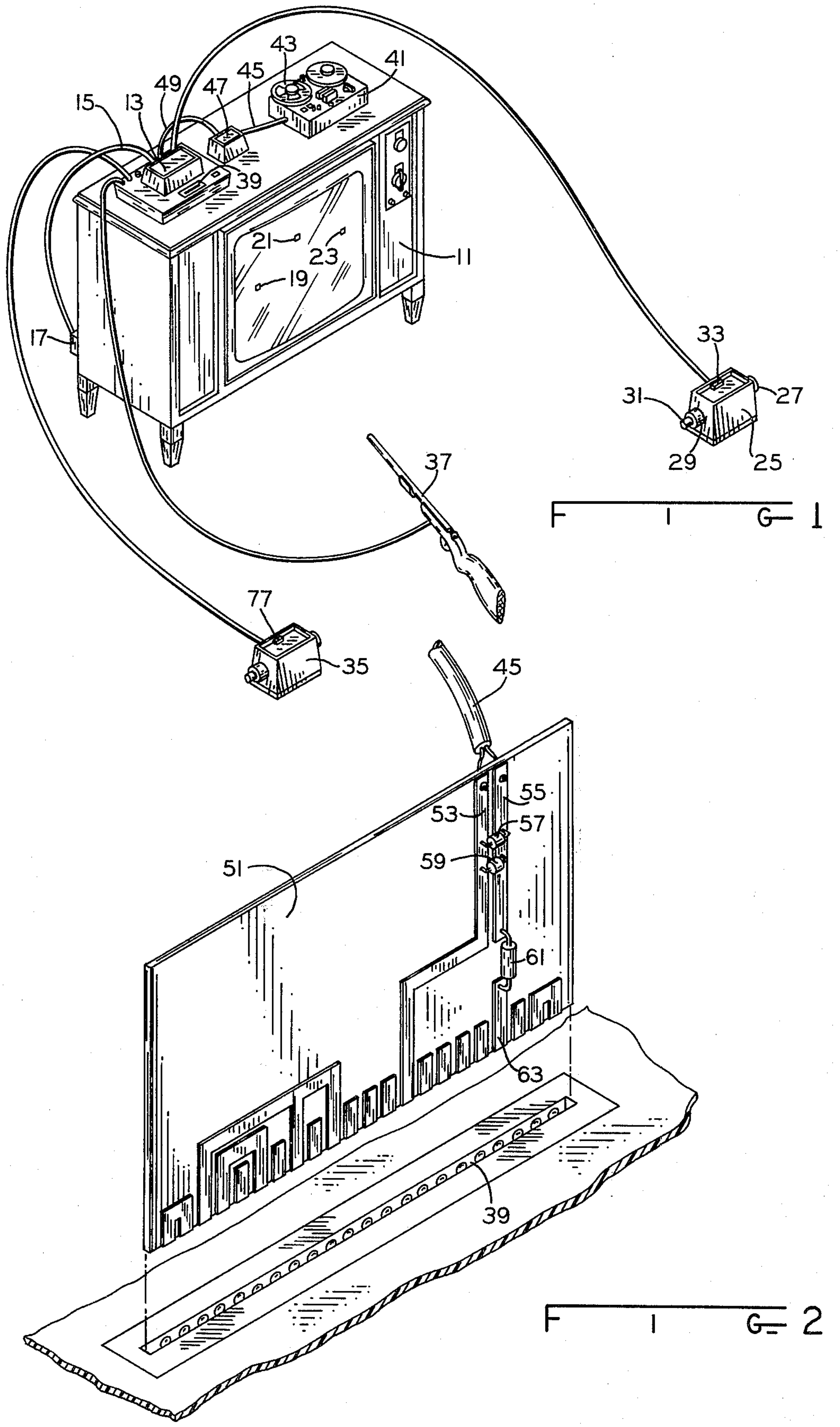
FIG. 1 is a perspective view of a television receiver having a game playing attachment, typical player control units, and a preprogrammed control unit coupled thereto.
FIG. 2 is a perspective view of a game circuit selector for coupling the preprogrammed control unit to the game playing attachment.

Considering first FIG. 1, the game playing device of the present invention is seen to generally comprise in conjunction with a standard home television receiver 11, electronic circuitry 13 for generating radio frequency signals which are supplied to the antenna terminals of the television receiver 11 by way of a cable 15 and adapter 17 to cause the receiver to display on its screen player controllable spots such as 19, 21, and 23. The spot 23, for example, may be rectangular bright spot on the screen which may be controlled by the player control unit 25. A player, by moving the vertical position potentiometer 27, may move his spot 23 up and down on the screen and by moving the horizontal control potentiometer 29 may move the spot 23 to the left or right on the screen. The player control unit 25 also includes an English control potentiometer 31 which varies the vertical position of a ball spot 21 under certain circumstances and the player control unit may also include a reset button 33 for returning the ball 21 from an off screen position to the playing area of the screen again under certain circumstances to be discussed subsequently. Typically, the complete gaming system also includes a player control unit 35 which is similar to the player control unit 25 but functions to control a second player spot 19. The game playing equipment may also include a light sensing rifle 37 which when pointed at one of the spots on the television screen and "fired" will function to, for example, extinguish that spot. For changing from one type of game to the other, the electronic circuitry 13 is provided with a printed circuit card connector 39 which will accept any of several printed circuit cards which define a particular mode of operation of the equipment.

Also illustrated in FIG. 1 is a magnetic tape player 41 which is illustrated as a reel-type player having a game tape 43 mounted thereon. This tape player could, of course, be a cassette-type machine as well as virtually any other type of replay device. The output of the tape player 41 which may be one or more channels or tracks is fed by way of cable 45 to a means 47 for supplying control signals to selected gaming device components within the circuitry 13 by way of cable 49. The precise nature of the means 47 will become more apparent from its possible variations as discussed in reference to the remaining drawings.

In FIG. 2, the means 47 and cable 49 have been combined with a game circuit selector card 51. The cable 45 leading from the magnetic tape player 41 connects to printed circuit conductor 53 and 55 on the selector card and these two conductors are bridged by a capacitor 57 and an inductance 59, the parallel combination of which is tuned to an audio frequency carrier frequency. A diode 61 bridges the gap between the conductive strip 55 and a selected conductive strip 63 near the bottom of the card which, of course, is positioned relative to the connector 39 so as to supply the envelope of the signal incoming on cable 45 to appropriate points within the game playing device. The game control signals which are recorded on the magnetic tape 43, in this example, would be in the form of a modulated audio carrier of the frequency to which the parallel L-C combination is tuned with detection being accomplished by the diode 61. The card 51 might optionally be provided with additional printed circuit conductors near its top edge and the cable 45 coupled to the card 51 by means of a second printed circuit connector much like connector 39. This last modification would, of course, facilitate changing cards to play different games, for example, where the preprogrammed control information is to be supplied to a different component within the gaming device 13.

Whether the information from the game tape 43 is supplied to the gaming device 13 by way of a printed circuit card such as 51 as illustrated in FIG. 2 or by way of the relatively fixed demodulation means 47 of FIG. 1 or by another means is immaterial to the discussion of the remaining drawings.

Figure 3:
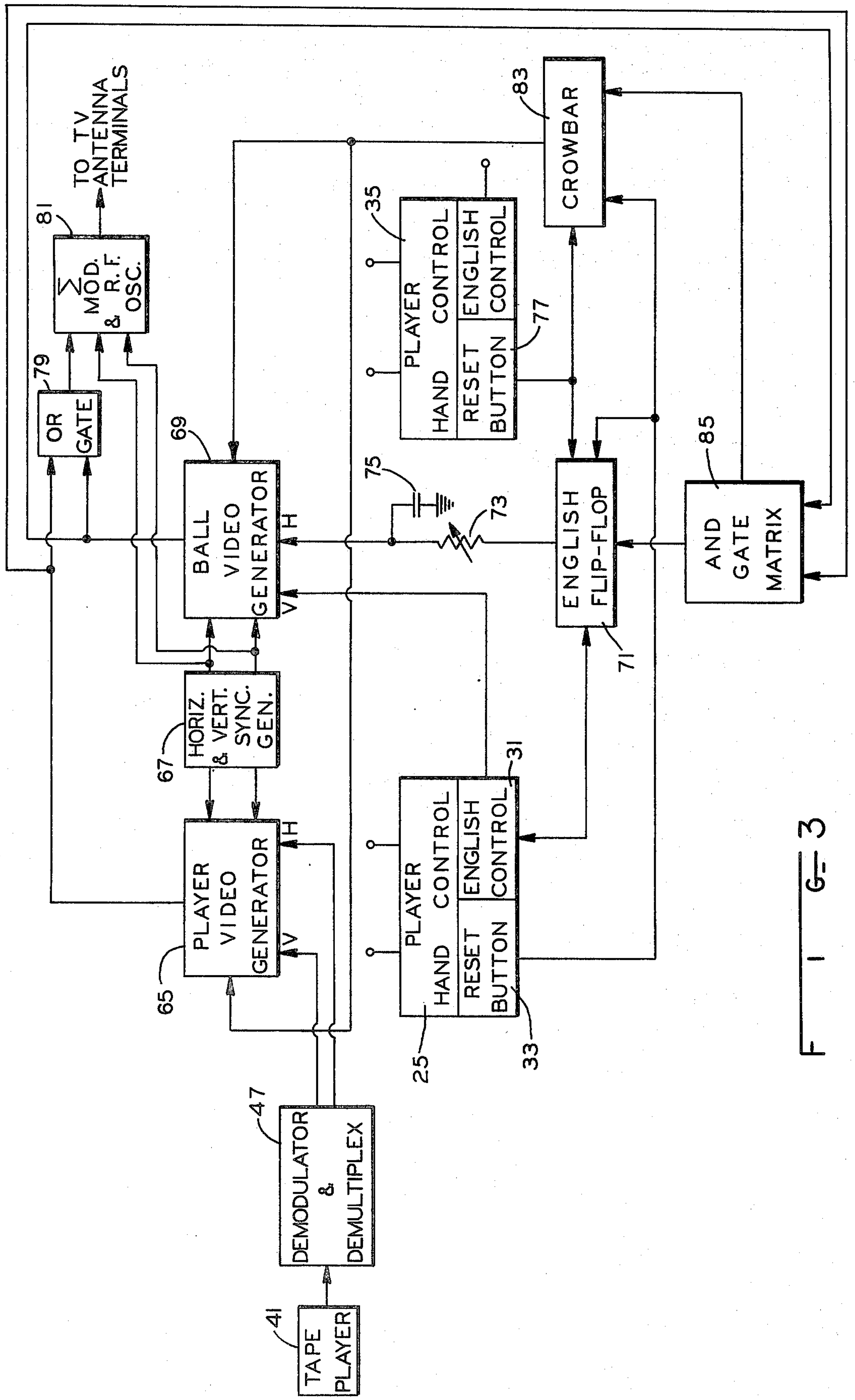
FIG. 3 is a functional block diagram for the electronic circuitry used in playing an exemplary preprogrammed game in accordance with the present invention.

Turning now to FIG. 3, the tape player 41 is illustrated as being coupled to a demodulator and demultiplexer 47 which functions to provide a plurality of control signals from the information recorded on a game tape. The remaining functional elements in FIG. 3 are all components within the game playing circuitry 13 of FIG. 1 and are illustrated as being interconnected to play a specific illustrative type of game. A component 65 generates, for example, the spot 23 by appropriately delaying shaping and combining horizontal and vertical synchronizing signals from a generator 67. Under normal circumstances the spot generator component 65 is controlled by the vertical and horizontal position control potentiometers on the associated player control unit 25, however, as illustrated in FIG. 3, these horizontal and vertical control leads from the player control unit 25 are not used and in their stead the control signals from the tape player 41 are fed to the spot generator 65. Thus, the information on a game tape in this particular illustrative system controls the horizontal and vertical position of a spot 23. A ball generator 69 also appropriately delays and combines the horizontal and vertical synchronizing signals from the generator 67 to generate signals for the ball spot 21 and the vertical position of this ball is determined by the English control potentiometer 31 on the player control unit 25 or this vertical position is determined by the English control on another player control unit, depending upon the state of the English flip-flop 71. This, as noted earlier, depends on whether the ball 21 is moving from left to right or from right to left. The English flip-flop 71 also provides an output signal by way of variable resistor 73 (generally controlled by a speed control knob mounted on the unit 13) and the current flowing through this variable resistor charging the capacitor 75 determines the speed with which the ball scans across the screen of the television receiver. In the particular game illustrated in FIG. 3, a second player and control unit 35 is present only because its reset button 77 will be occasionally employed, however, in other games this unit 35 might be coupled to a second player video generator and its output employed for generating the marker such as 19 of FIG. 1. The video generator outputs are combined in an "Or" gate 79 and modulated onto a radio frequency carrier in the summer and oscillator unit 81 to be supplied to the antenna terminals of a television receiver. Alternatively, a TV monitor may be used by eliminating the RF modulator, oscillator and TV receiver RF circuitry and feeding the summer output directly to the video circuitry of the monitor. Any one or a combination of the video generator outputs may be extinguished so as to extinguish the corresponding spot on the screen by grounding its output utilizing a so-called crowbar circuit 83. The crowbar circuit 83 may in turn be energized to its dot extinguishing state by a coincidence indication from the "And" gate 85 indicating coincidence of certain ones of the spots. The crowbar circuit is extinguished allowing the spot generator to again provide an output by depressing either one of the player reset buttons 33 or 77. The state of the English flip-flop 71 is similarly changed by depressing the appropriate one of the reset buttons. The game of FIG. 3 is now easily understood. The spot 23 of FIG. 1 executes movement as a function of time as determined by information on the game tape. Assuming that the ball spot 21 is in its off screen left position as veiwed in FIG. 1, this ball is "returned" to the right hand player by depressing the reset button 77. This then allows the right hand player to depress his reset button 33 starting the ball across the screen from right to left and that player may vary his English control 31 to vary the vertical position of the ball as it traverses the screen. The player, of course, attempts to intercept the spot 23 as it moves about and if he is successful, the outputs of the video generators 65 and 69 will be time coincident thus enabling the output of And gate matrix 85 to change the state of the English flip-flop 71 and energize the crowbar circuit 83 to extinguish both of the spots. If the player is unsuccessful in intercepting the spot 23, the ball 21 merely passes to its off screen left position and must be returned to that player by depressing the reset button 77.

Figure 4:
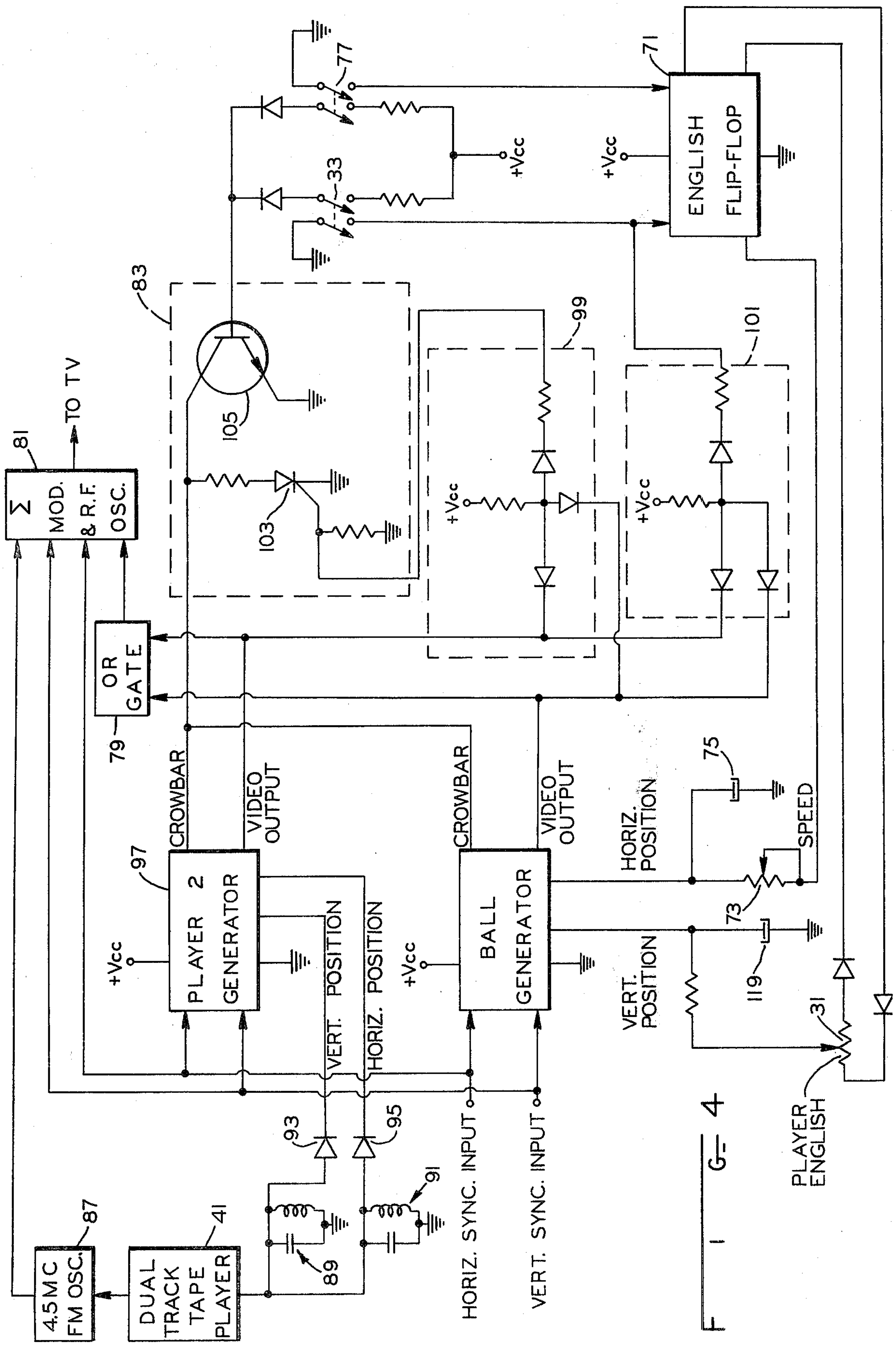
FIG. 4 is a partially schematic partially block diagramatic depiction of circuitry for implementing the functional block diagram of FIG. 3.
Figure 5:
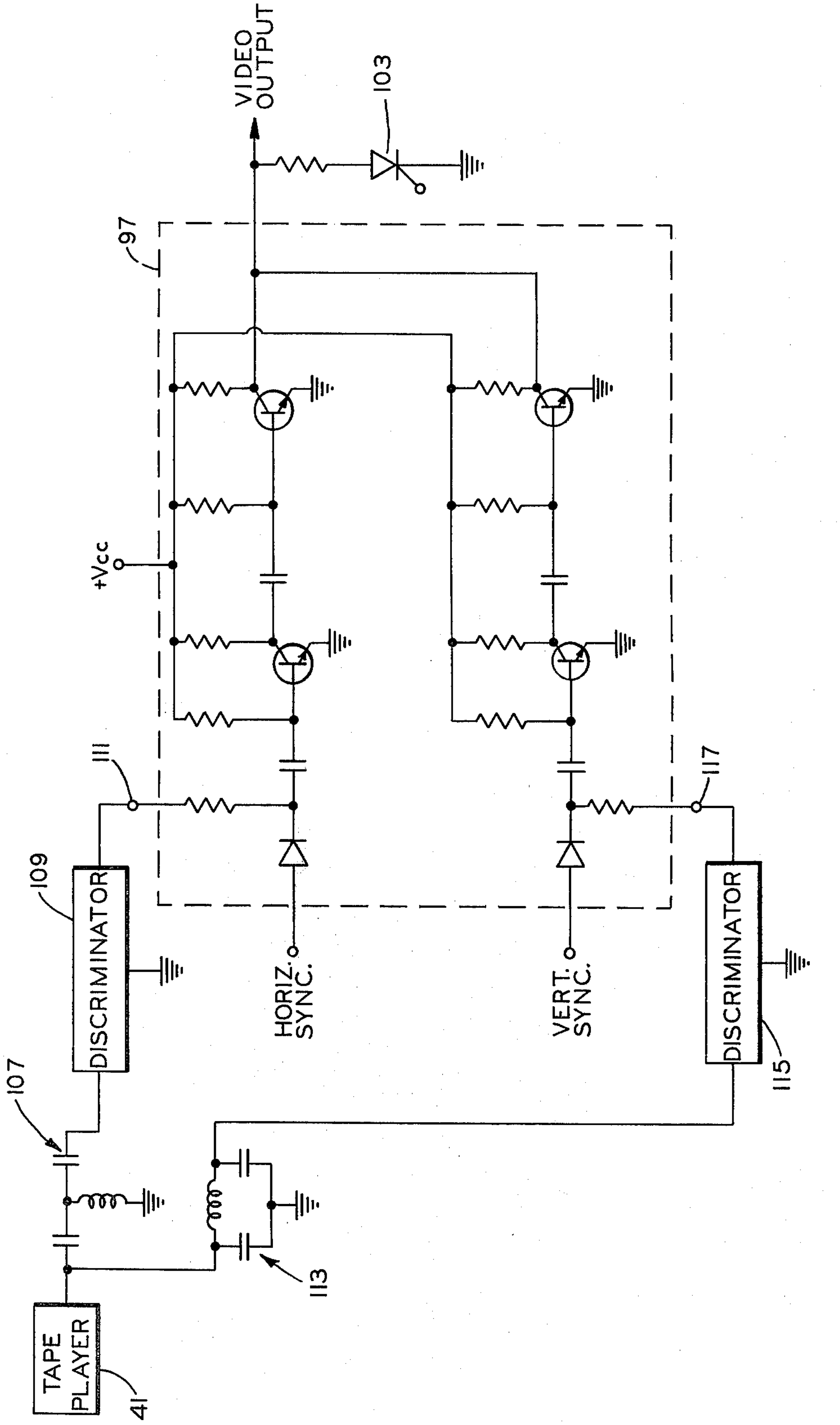
FIG. 5 is a schematic diagram of a marker generator coupled to the preprogrammed means in a manner alternative to that illustrated in FIG. 4.

The details of operation of the exemplary game of FIG. 3 are better illustrated in FIGS. 4 and 5 and some possible variations on the present invention are also therein illustrated. In FIG. 4 the tape player 41 is illustrated as a dual track device and while both tracks could be used for preprogrammed control signals, one of the tracks is herein employed to record game related audio information such as player instructions or background sound effects either of which will, of course, be synchronized with the movement, for example, of the spot 23 on the television screen. While these audible game related signals might come directly from a tape player speaker, they are herein illustrated as coming from the television receiver speaker by presenting them to the television receiver antenna terminals as the normal frequency modulated 4.5 megacycle audio subcarrier. This, of course, requires a 4.5 megacycle FM oscillator 87, the output of which is supplied to the summer and oscillator 81 for superimposition with the other signals to be supplied to the television receiver. 103 thus While there are a multitude of ways to record and present control signals to the equipment, in FIG. 4 these control signals would be recorded on one track of the game tape in an amplitude modulated frequency multiplexed manner. One carrier frequency would correspond to the resonant frequency of the tuned circuit 89 and the other carrier would correspond to the resonant frequency of the tuned circuit 91. Demodulation of each of these carriers would be accomplished by simple diode detectors 93 and 95 and the thus demodulated control signals presented to the vertical and horizontal voltage control points of the spot generator 97. The crowbar circuit 83 is enclosed in dotted lines and the two simple diode And gates 99 and 101 together correspond to the And gate matrix 85 of FIG. 3. The And gate 99, in response to correspondence of the video outputs from the generators 97 and 69, turns on a silicon controlled rectifier 103 grounding the two video outputs causing both markers to disappear from the television screen. When the And gate 99 no longer supplies a coincidence signal, the silicon controlled rectifier 103 continues to conduct and short out the video outputs until such time as transistor 105 is energized to conduct thus bypassing the sustaining current through silicon controlled rectifier 103 and causing the spots to reappear. Transistor 105, of course, is caused to conduct by depressing one of the reset buttons 33 or 77.

FIG. 5 illustrates a spot generator such as 97 of FIG. 4 in greater detail and further shows a variation on the preprogrammed control of the position of that spot. In FIG. 5 the tape player 41 is a single track device having high and low frequency modulated carrier signals recorded thereon. These frequencies are separated and the higher frequency passed by way of high pass filter 107 to a discriminator 109 of any known variety, to provide an output control voltage to the terminal 111. Analogously lowpass filter 113 supplies the other FM carrier to a discriminator 115 to supply a vertical control voltage to the point 117. As noted in, for example, the aforementioned U.S. Pat. No. 3,659,285, these points 111 and 117 are voltage control points for determining the delays imparted to horizontal and vertical synchronizing signals and thus are points the voltages at which determine the horizontal and vertical position of the spot.

Figure 6:
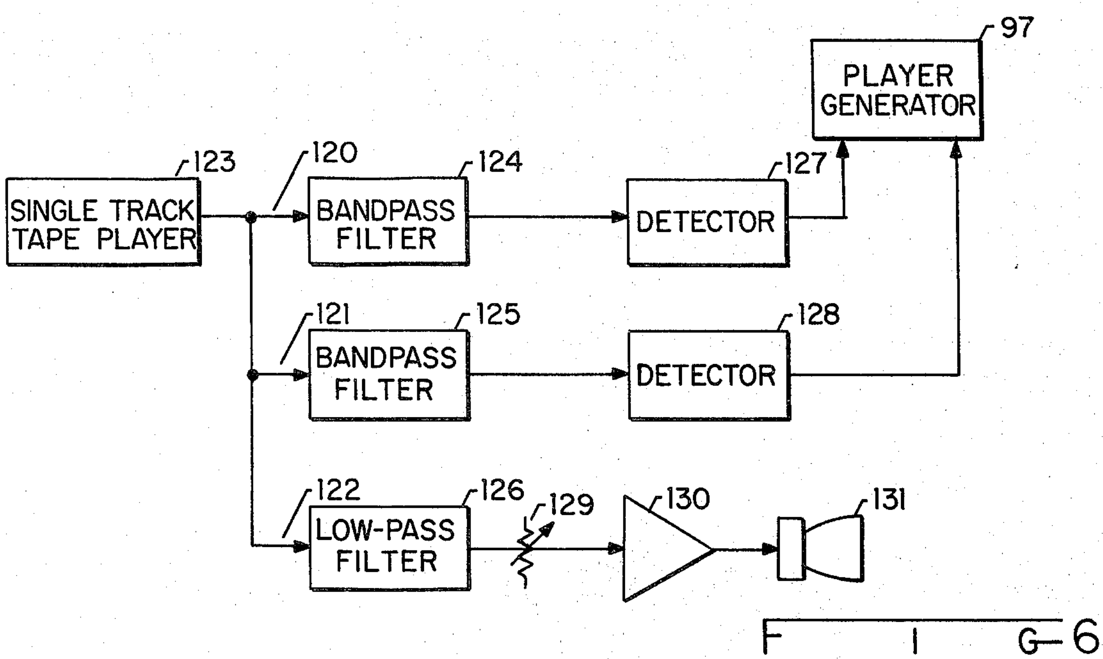
FIG. 6 is a block diagram of a demodulator for separation of vertical and horizontal control signals and audio which may be recorded in the preprogrammed control unit of FIG. 1.

Referring now to FIG. 6 there is illustrated thereby a block diagram representation of demodulation circuitry required for the separation of recorded vertical and horizontal control signals, as well as any audio (voice, etc.) which may be present on the prerecorded tape. In the FIG. 6 embodiment, the prerecorded information is recorded on a single track tape. Three channels are recorded on a single track; specifically, a channel for the vertical control signal to control the vertical positioning of a marker, a channel for the horizontal control signal to control the horizontal positioning of a marker, and an audio channel containing voice or other audible signal.

The single track prerecorded tape is played on a single track tape player 123, the output from which is applied to three channels 120, 121 and 122 for the vertical, horizontal and audio signals. Three filters, 124, 125 and 126 separate the channels of information recorded on the single track tape. Bandpass filter 124 only passes the vertical spot positioning information, bandpass filter 125 only passes the horizontal spot positioning information, and low-pass filter 126 only passes the audible information. The amplitude modulated vertical information is detected by a detector 127 of conventional design, and the output therefrom applied to the vertical control portion of the player generator 97. In like fashion, the horizontal information is detected by detector 128 and applied to the horizontal portion of the player generator. The audio audible information, for example, music or voice from low-pass filter 126, is coupled to a volume control 129, amplified in audio amplifier 130, and applied to a speaker 131.

This particular arrangement is only used if the information recorded on the single track tape is amplitude modulated. However, the information can be recorded as frequency modulation, pulse width modulation or pulse position modulation. In this event the detectors 127 and 128 would be eliminated and discriminators substituted therefor for FM modulation, as well known in the art. Additionally, limiters would be placed between the bandpass filters 124 and 125 and their corresponding discriminators.

As earlier mentioned in the specification, the output from the audio amplifier 130, rather than being applied to speaker 131, could be applied to a 4.5 megahertz FM oscillator, and to the summer modulator and RF oscillator 81, whereby the audio voice information would be directly mixed with the rest of the video signal applied to the TV antenna terminals.

Figure 7:
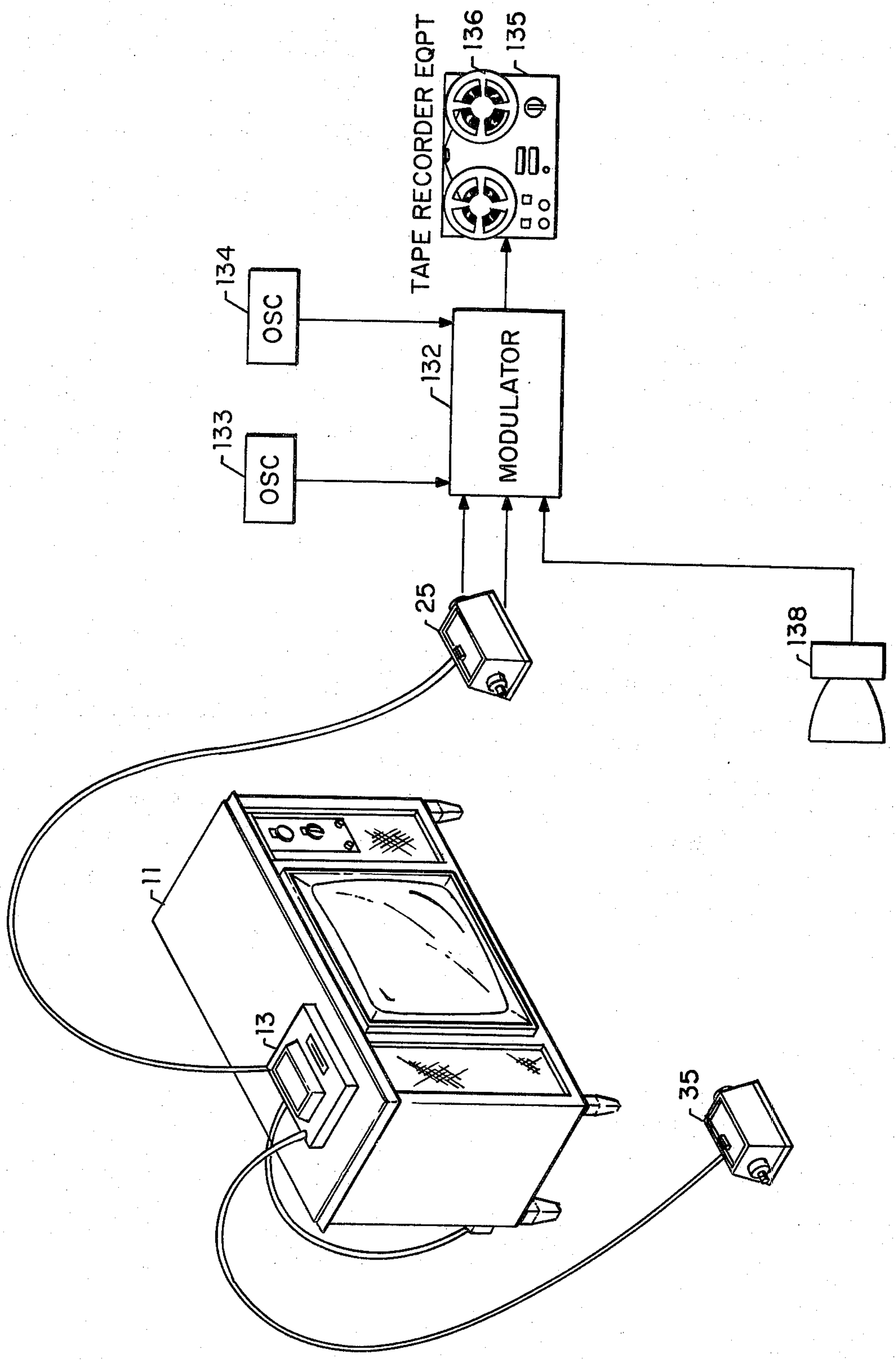
FIG. 7 is a block diagram depicting the means for creating a recorded tape for use in the preprogrammed control unit.

FIG. 7 shows in block diagram format a representative arrangement of equipment required to create the prerecorded tape or record. This arrangement can be used for single or multiple track recording, regardless of the type of modulation employed and irrespective of the presence or absence of audio (voice, music, etc.) accompaniment. One of the player control units 25 or 35 is used to generate the horizontal and vertical positioning signals. The horizontal and vertical outputs are applied to modulator 132, which has inputs from oscillators 133 and 134 to generate the two band signals. If audio, such as voice or music, is to be recorded, it is applied, for example, from a microphone 138 to the modulator. The modulator 132 is of conventional design, either an amplitude modulator, frequency modulator or pulse width modulator, is well known in the art. The output from the modulator is applied to a recorder 135, recording on tape 136, or alternatively for recording on discs or the like.

By also coupling the output from the player control unit through the electronic circuitry 13, connected to the television receiver 11, the user may monitor the information being recorded on the tape by viewing the television receiver and seeing the positioning of the spot while he is making the tape.

Figure 8:
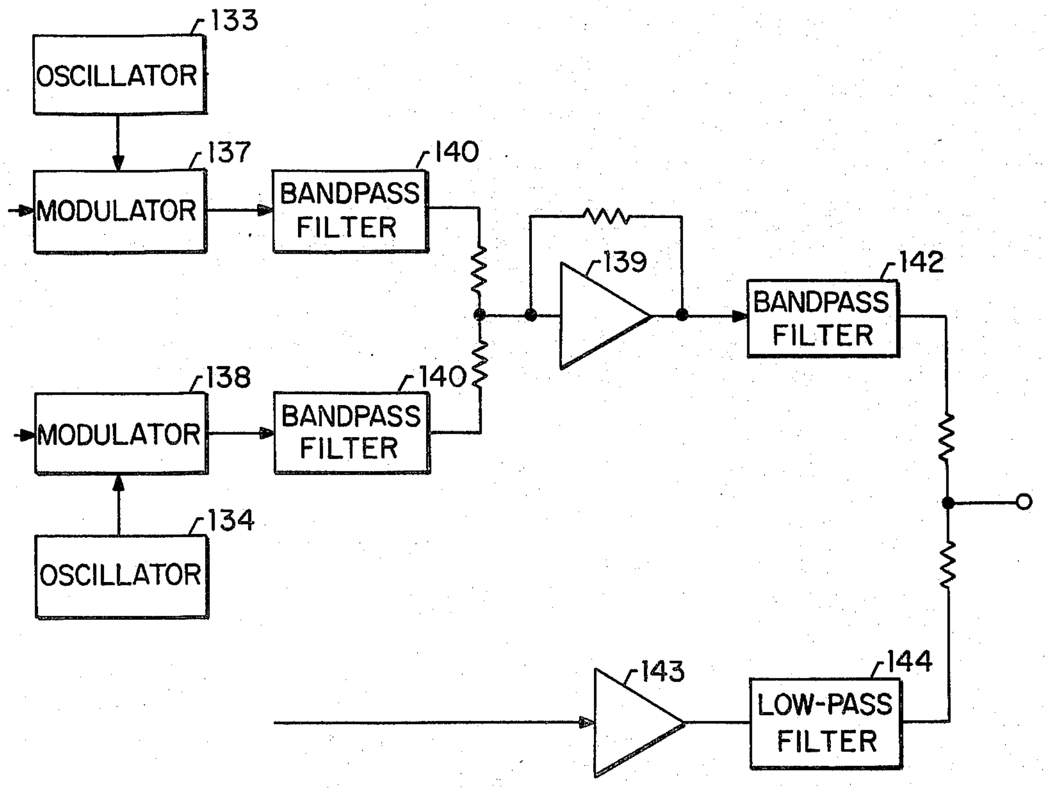
FIG. 8 is a block diagram of the modulator electronics (signal processor) for implementing the block diagram of FIG. 7.

FIG. 8 illustrates in greater detail the modulator 132 of FIG. 7. The horizontal and vertical control signals from the player control unit are applied to respective modulators 137 and 138, having inputs from audio oscillators 133 and 134. The outputs from the modulators 137 and 138 are summed into an amplifier 139 through bandpass filters 140 and 141. The output from audio amplifier 139 is applied to the tape recorder through a bandpass filter 142. The voice, music, or other audio, is applied from an amplifier 143 through a low-pass filter 144 to the tape recorder. Low-pass filter 144 is used to keep the voice below, for example, 2700 hertz, so that the voice will not interfere with the audio control signals which are of a frequency on the order of 3000 – 5000 hertz.

Figure 9:
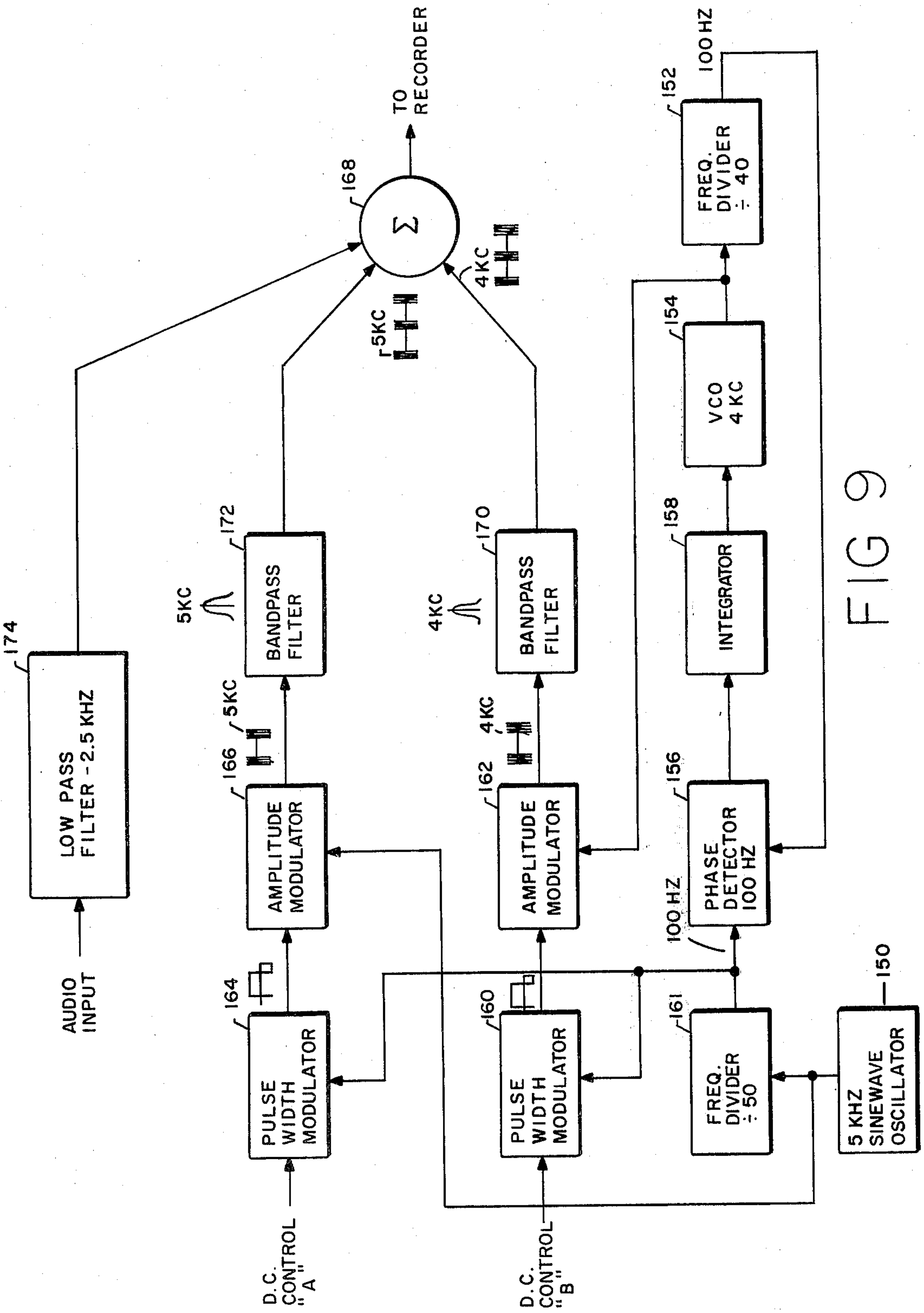
FIG. 9 is a block diagrammetic representation of one form of recording electronics required for pulse width modulation.

Practical tape playback units of the low cost variety widely owned today, have inherent defects of performance of minor importance to the reproduction of voice and music. These problems do, however, complicate the task of extracting control signals required by the present invention. Specifically, a practical device must cope successfully with tape speed variations of the short term type commonly called wow and flutter, and of the long term type resulting from mechanical and circuit drifts and/or driving battery conditions. Furthermore, even high modern recording tape has severe dropouts and uncontrolled sensitivity, causing spurious amplitude modulation to appear on the desired signal. Accordingly, a further element of this invention is the recording and reproduction of pulse width modulated audio tones able to result in acceptable performance in the presence of the recording mediums above-mentioned shortcomings. FIG. 9 shows a block diagrammetic representation of one form of record electronic circuitry required for pulse width modulation. In this system a 5 KHz oscillator 150 is used to provide two tones, 5 KHz and 4 KHz spaced precisely 1 KHz apart by means of a conventional phase locked loop comprised of a frequency divider 152, VCO 154, detector 156 and integrator 158. A divide by 50 circuit 161 provides a 100 Hertz/sec pulse signal which is used to trigger a pulse width modulator 160, such as a one-shot. This pulse width modulator receives a D.C. control voltage, such as from a hand control on one of the player control units 25 or 35 and converts it into a corresponding pulse waveform with a repetition rate of 100 pps and a ration of positive-going square wave to negative going square wave proportional to the D.C. control voltage. Thus, a D.C. control voltage representing a weaker position halfway across the screen may result in a 100 Hz square wave of equal positive and negative duration, i.e. a symmetrical square wave. This pulse width control 100 Hz pulse waveform amplitude modulates the 4 KHz carrier previously described via an amplitude modulator 162. Similarly, a second hand control provides a properly amplitude and pulse width modulated 5 KHz tone via a pulse width modulator 164 and amplitude modulator 166. These tones as well as desired audio (voice, music) are combined in a summer 168 and applied to the master tape or disk recording system. The tones are applied to summer 168 via band-pass filter 170 and 172, respectively, and the audio through low pass filter 174.

Figure 10:
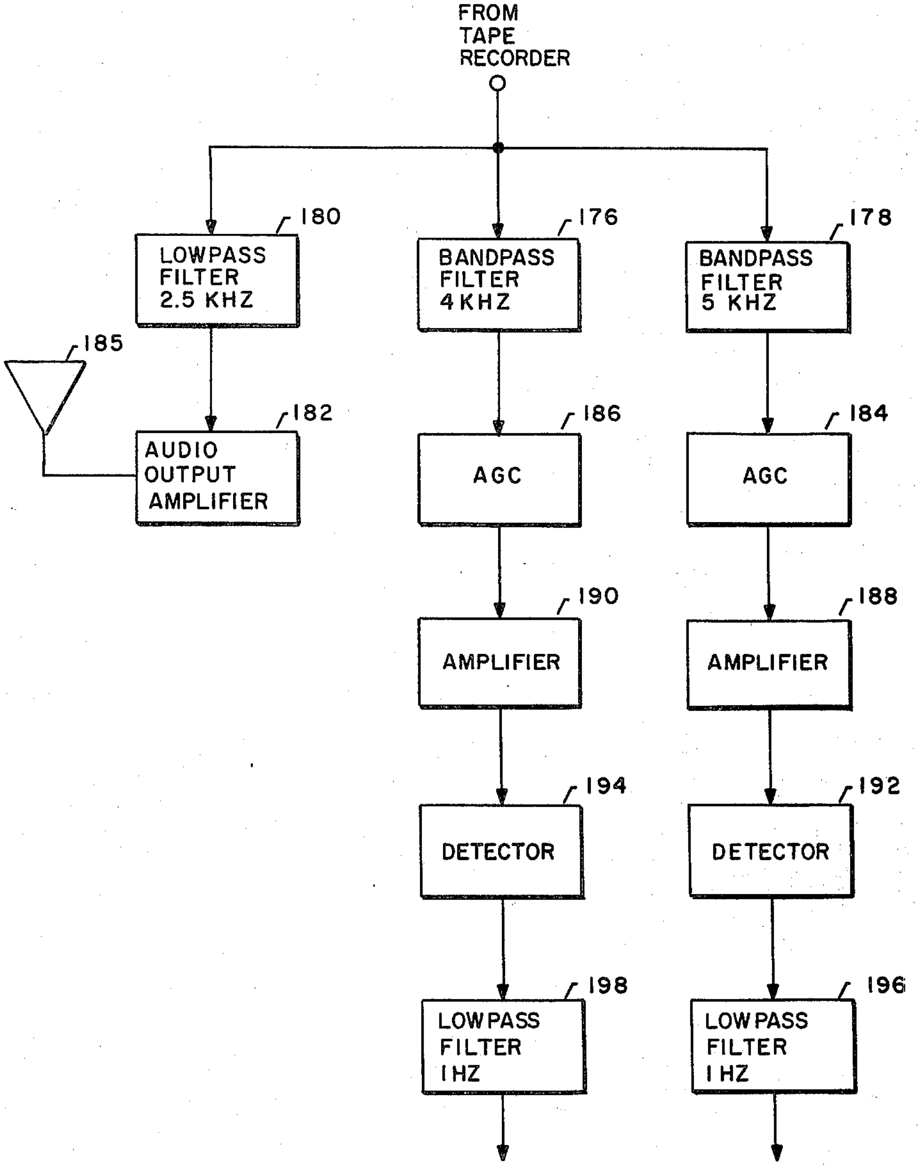
FIG. 10 is a clock diagrammetic representation of one form of playback electronics required to decode the received pulse width modulation signal.

When playing this recording or a duplicate thru the playback electronics represented diagrammetically in FIG. 10, control voltages will be recovered for spot control which are an acceptable replica of the recorded D.C. control voltage, in spite of the aforementioned technical problems inherent in the recording/reproducing system. Referring to FIG. 10 it is seen that band pass filter 176, 178 and 180 adequate to handle the speed variations of the system allow the extraction (de-multiplexing) of the two tones (4 KC and 5 KC) and the audio spectrum (on the order of 300 to 2700 Hz/sec). The latter consists simply of audio amplifier 182 and a speaker system 185 or a 4.5 MC FM system such as is shown in FIG. 4. The two tones are processed by AGC circuits 184 and 186 which handle wide variations of amplitude resulting from differences in playback apparatus parameters. Next, the 100 Hz pulse waveform components are stripped off the 4 or 5 KHz carriers by amplifiers 188 and 190 and detector 192 and 194. Low pass filters 196 and 198 integrate the 100Hz rectified component to provide a D.C. voltage proportional to the off/on ratio of the 100 Hz waveform which determines spot position of the displayed spot on the screen.

While the present invention has been described with respect to a specific preferred embodiment and an exemplary game, it should be clear that this one projectile target-type game is only indicative of the vastly expanded repertoire of television gaming devices employing the present invention. As a variation on the game disclosed, the information supplied from the preprogrammed tape player might cause one of the spots to execute a circular motion, for example, behind a circular television screen overlay having a roulette pattern of numbers thereon. Instead of extinguishing both spots when two spots become coincident, the projectile spot of the previously discussed game (the ball) could by substantially increasing the value of capacitor 75 be made to very slowly move across the screen in a horizontal direction and the crowbar circuit 83 replaced by a circuit for causing the ball to blink, extinguish on the blink when it becomes coincident with the preprogrammed marker thus providing a roulette type game. Skeet shooting and chase type games using the prerecorded motion of one or more of the spots as well as the implementation of single player ping-pong, handball, hockey and the like are clearly within the scope of the present inventions as are systems for changing spot size to give the illusion of an approaching or receding marker and even the possibility of controlling marker color in a color television receiver is within the scope of the present invention. Some of these variations may be facilitated by using the programmed control signal to switch a trigger circuit and then using the trigger circuit output pulse for further switching actions. Also, within the scope of the present invention is having preprogrammed tape player available at a cooperative television station such as a CATV station to broadcast spots to interact with spots generated by a player at his home receiver. Numerous other variations and modifications will suggest themselves to those of ordinary skill in the art and accordingly the scope of the present invention is to be measured only by that of the appended claims.

1. Apparatus for playing games on the screen of a cathode ray tube comprising:

means for generating on the screen a first spot having a plurality of visible variables associated therewith and representing a first moving game playing object;

means for generating on the screen a second spot having a plurality of visible variables associated therewith and representing a second moving game playing object;

player actuable means for controlling at least one variable of at least one of the spots; and prerecorded means having control signals recorded thereon in the form of a modulated audio frequency signal for automatically controlling at least one variable of at least one of the spots.

2. The apparatus of claim 1 wherein the first mentioned at least one variable is distinct from the last mentioned at least one variable.

3. The apparatus of claim 1 wherein the prerecorded means comprises a magnetic recording member.

4. The apparatus of claim 1 wherein the audio frequency signal is frequency modulated and further comprising a discriminator for demodulating the audio frequency signal and providing output control signals to at least one of the means for generating.

5. The apparatus of claim 1 wherein the audio frequency signal is amplitude modulated and further comprising demodulator means responsive to the amplitude modulated signal for supplying control signals to at least one of the means for generating.

6. The apparatus of claim 1 wherein the audio frequency signal is pulse width modulated and further comprising demodulator means responsive to the pulse width modulated signal for supplying control signals to at least one of the means for generating.

7. The apparatus of claim 1 wherein the audio frequency signal is pulse position modulated and further comprising demodulator means responsive to the pulse position modulated signal for supplying control signals to at least one of the means for generating.

8. The apparatus of claim 1 wherein the pluralities of visible variables include spot intensity and spot position both as functions of time.

9. The apparatus of claim 1 wherein said cathode ray tube is a television cathode ray tube and wherein said prerecorded means is coupled to a cooperative television station transmitter to present background sots for interacting with spots generated at the site of said television cathode ray tube.

10. The apparatus of claim 1 wherein the prerecorded means comprises a record/disc.

11. The apparatus of claim 1 wherein the control signals are recorded on the prerecorded means in the form of a plurality of modulated audio frequency signals, further comprising a like plurality of demodulator means and means for separating the plurality of audio frequency signals and for supplying one audio frequency signal to each demodulator means.

12. The apparatus of claim 1 wherein the prerecorded means includes at least two tracks and further comprising a frequency modulatable oscillator responsive to signals on one track, and means for presenting the oscillator output to antenna terminals of a television receiver as an audio subcarrier.

13. The apparatus of claim 1 wherein the prerecorded means has one track with multiplexed control signals and related audio accompaniment.

14. Apparatus for playing games on the screen of a cathode ray tube comprising:

means for generating and displaying on the screen at least one game spot having a plurality of visible variables associated therewith;

player actuable means coupled to said means for generating for controlling at least one of the variables; and prerecorded means having control signals recorded thereon in the form of a modulated audio frequency signal coupled to said means for generating for automatically controlling at least one of the variables to thereby allow active participation by a player in determining the progress of a game while a part of the progress of the game is predetermined by the prerecorded means.

15. The apparatus of claim 14 wherein the prerecorded means comprises a magnetic recording member.

16. The apparatus of claim 14 wherein the prerecorded means comprises one track of a dual track magnetic recording member and further comprising means including the other track of the magnetic recording member for providing audible game related signals.

17. The apparatus of claim 16 wherein the means for providing audible game related signals includes a frequency modulated oscillator responsive to signals on the said other track for providing an output and means for presenting the oscillator output to antenna terminals of a television receiver as an audio subcarrier signal.

18. The apparatus of claim 15 wherein said magnetic recording member is a single track and wherein audible game related signals are recorded on said single track restricted to a frequency less than 2700 hertz.

19. The apparatus of claim 14 wherein the prerecorded means comprises recording means for supplying prerecorded control signals modulated on at least one audio frequency carrier signal and demodulating means responsive to the recording means for supplying the control signals as an output.

20. The apparatus of claim 14 wherein the means for generating comprises a source of horizontal and vertical synchronizing signals and a plurality of spot generators responsive to the synchronizing signal source, there being one generator for each spot to be displayed, each generator comprising voltage controllable delay means for delaying the horizontal and vertical synchronizing signals and amount determined by control voltages and means for combining the thus delayed signals.

21. The apparatus of claim 14 wherein at least two spots are displayed, said player actuable means adapted to control at least one component of the location on the screen of one of the spots and said prerecorded means adapted to control at least one component of the location on the screen of the other of the spots.

22. The apparatus of claim 14 wherein the prerecorded means comprises a record/disc.

23. The apparatus of claim 14 wherein the control signals are recorded on the prerecorded means in the form of a plurality of modulated audio frequency signals, and further comprising a like plurality of demodulator means and means for separating the plurality of audio frequency signals and for supplying one audio frequency signal to each demodulator means.

24. The apparatus of claim 14 wherein the prerecorded means includes at least two tracks and further comprising a frequency modulatable oscillator responsive to signals on one track, and means for presenting the oscillator output to antenna terminals of a television receiver as an audio subcarrier.

25. The apparatus of claim 14 wherein the prerecorded means has one track with multiplexed control signals and related audio accompaniment.

* * * * *